United States Patent [19]

Gallant

[11] 4,286,737
[45] Sep. 1, 1981

[54] FERTILIZER DISPENSER WITH ONE-HANDED ACTUATION

[76] Inventor: Edward Gallant, R.D. #2, Cambridge Springs, Pa. 16403

[21] Appl. No.: 123,497

[22] Filed: Feb. 22, 1980

[51] Int. Cl.³ .................. B65D 23/10; B65D 25/48; B65D 83/06
[52] U.S. Cl. ................................ 222/470; 222/510; 222/518
[58] Field of Search ............ 222/470, 471, 510, 518; 137/533.29, 543.19

[56] References Cited

U.S. PATENT DOCUMENTS

| 886,045 | 4/1908 | Ehrlich | 137/543.19 |
|---|---|---|---|
| 1,579,390 | 4/1926 | Peadem | 222/510 X |
| 1,880,625 | 10/1932 | Wilmeth | 222/510 X |
| 2,851,962 | 4/1958 | Hausen | 222/510 X |
| 2,861,721 | 11/1958 | Race | 222/471 X |
| 2,918,083 | 12/1959 | Clark, Jr. et al. | 137/543.19 X |

Primary Examiner—David A. Scherbel

[57] ABSTRACT

A dispenser is disclosed suitable for dispensing fertilizer on the plants either in liquid or dry forms. The dispenser has a nipple at the lower end to which a hose can be connected and the nipple has a cylindrical opening with a valve seat in its lower end. A valve extends into the nipple and the valve has a rod on it that extends out the top of the tank and a handle on the upper end of the rod can be grasped by a person holding the tank by its handle to conveniently move the valve to open position thereby allowing fertilizer to be dispensed from the nipple. The rods extend upwardly from the nipple to guide the valve into engagement with the valve seat.

1 Claim, 3 Drawing Figures

FERTILIZER DISPENSER WITH ONE-HANDED ACTUATION

GENERAL DESCRIPTION OF THE INVENTION

A dispenser is disclosed suitable for depositing fertilizer in either liquid form or dry form on plants. The dispenser has a tank that terminates at its lower end in a hollow nipple with a partition across the open end of the nipple. The partition has a valve seat on it and a frustoconical valve seat on the valve seat. A rod is attached to the valve and the rod extends up through an opening in the top of the tank and has a handle attached to it. The tank itself has a handle and a person gripping the tank handle can place his finger under the rod handle and lift the valve away from the valve seat to dispense the material. Vertically extending rods are spaced around the opening in the partition of the nipple so that the valve can be pulled up out of the nipple to allow the material to flow freely from the dispenser, yet be directed back into its seat by the rods.

OBJECTS OF THE INVENTION

It is an object of the invention to provide an improved fertilizer dispenser.

Another object of the invention is to provide a fertilizer dispenser that is simple in construction, economical to manufacture and simple and efficient to use.

Another object of the invention is to provide a fertilizer dispenser having a hollow nipple at its lower end with spaced rods around the nipple so that the frustoconical valve can be pulled up out of the hollow nipple and allow the fertilizer material to be dispensed therefrom.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
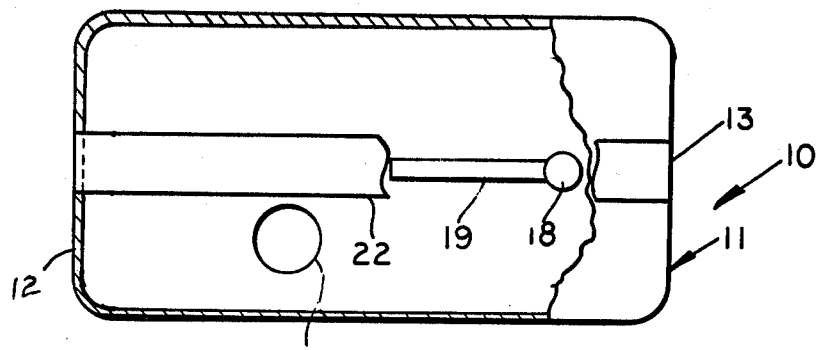
FIG. 1 is a top view of the invention.
Figure 2:
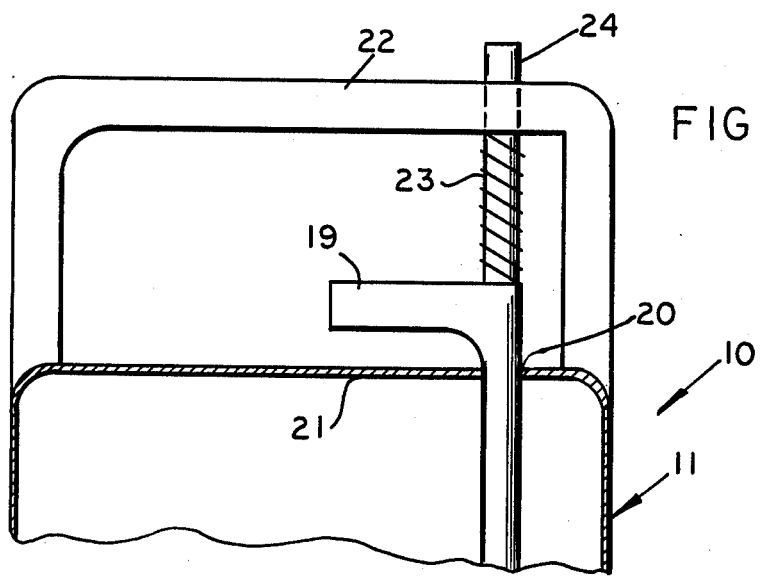
FIG. 2 is a longitudinal cross-sectional view of the dispenser according to the invention taken on Line 2—2 of FIG. 1.
Figure 3:
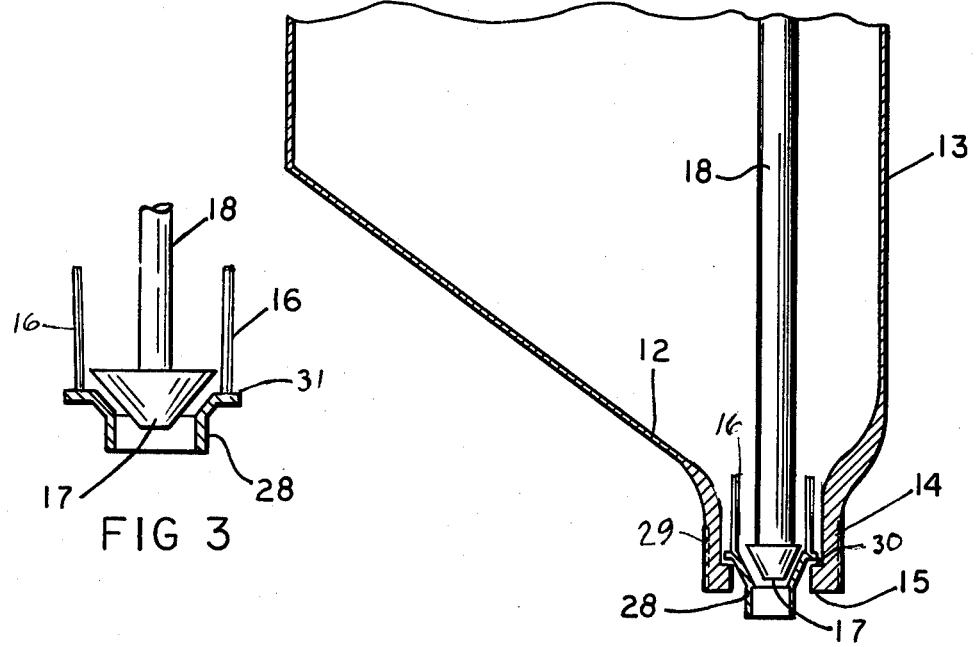
FIG. 3 is an enlarged view of the insert.

Now, with more particular reference to the drawings, a dispenser indicated generally at 10 has a tank 11 with a sloping bottom 12 extending downwardly toward the side 13 terminating in a cylindrical nipple 14 that may be externally threaded or otherwise provided with a suitable surface for attaching a hose thereto. The nipple 14 has a partition 15 across its lower end provided with a suitable valve seat or shoulders 30 and rods 16 interspaced around the opening in the nipple and extending upwardly therefrom forming a guide for the valve.

The valve 17 has a rod 18 fixed to it which extends upwardly through the hole 20 in the top 21 of the tank. A tank handle 22 is attached to the top of the tank and the handle 19 attached to the upper end of the rod may extend generally parallel to the handle 22. The compression spring 23 is supported between the handle 19 and the handle 22 and is held in location by a pin 24. Thus, when the tank 11 is filled through the filler opening 25, the material will run down the sloping bottom 12 to the opening in the cylindrical nipple 14 around the frustoconical valve 17 and when the operator exerts an upward force on the handle 19, the valve 17 will be pulled away from its seat up between the rods 16 and the materials will flow down around the valve and through the opening in seat 15.

Funnel-shaped inserts 28 fit into the opening partition 15 and has a flange 31 which rests on shoulder 30 and is interchangeable to provide different size dispensing openings.

Flange 31 has spaced upwardly extending rods 16 which guide the valve 17 up and down.

A hose or sprinkling head can be threaded into threads 29 for watering.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A dispenser comprising a tank having a bottom, a top and sides,
    said bottom sloping toward one of said sides and a hollow cylindrical nipple attached to said bottom forming an opening in said bottom,
    said hollow nipple having inwardly extending shoulders,
    a hollow insert having an outwardly directed flange resting on said shoulders,
    spaced first rods attached to said flange and extending upwardly therefrom,
    a valve disposed between said first rods and adapted to seat on said insert member,
    a second rod attached to said valve and extending upwardly therefrom,
    a handle on the upper end of said second rod,
    said tank having a second handle disposed generally perpendicuar to said rods said second handle being attached to said tank and a compression spring between said handles urging said valve into engagement with said insert member, said first handle being adapted to be moved toward said second handle for lifting said valve away from said insert to dispense material from said tank.

* * * * *